June 21, 1960  R. N. ABILD  2,941,353
SIGNAL MODIFIER FOR EXHAUST NOZZLE CONTROL
Filed Aug. 1, 1957  2 Sheets-Sheet 1

INVENTOR
ROBERT N. ABILD
BY
ATTORNEY

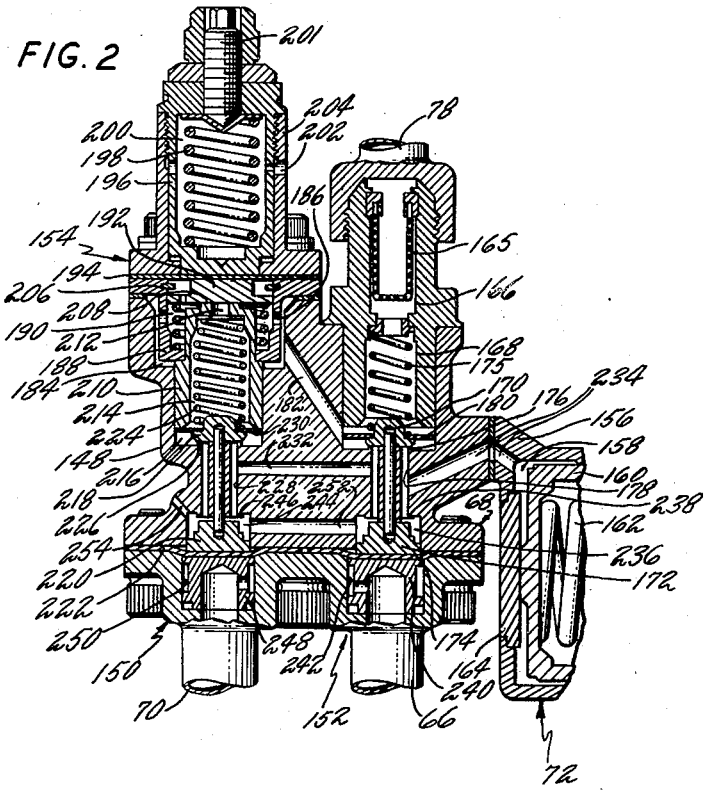

United States Patent Office 2,941,353
Patented June 21, 1960

2,941,353
SIGNAL MODIFIER FOR EXHAUST NOZZLE CONTROL

Robert N. Abild, New Britain, Conn., assignor to United Aircraft Corporation, East Hartford, Conn., a corporation of Delaware Filed Aug. 1, 1957, Ser. No. 675,653

5 Claims. (Cl. 60—35.6)

This invention relates to variable area exhaust nozzle systems for gas turbine power plants, more particularly to a signal modifier for use in such systems.

With gas turbine power plants having an afterburner and a variable area exhaust nozzle it is customary to effect non-afterburning operation with the exhaust nozzle closed and to effect afterburner operation with the nozzle opened or partially opened. To initiate afterburner operation it has been found desirable at sea level and low altitudes to light the afterburner with the exhaust nozzle open. However, above some predetermined altitude it has been found desirable to light the afterburner with the exhaust nozzle closed and to then open the nozzle.

To carry out this finding I have invented a signal modifier which permits the afterburner to be lighted with the exhaust nozzle open at sea level and low altitudes and which automatically changes to lighting with the exhaust nozzle closed above some set altitude. This is done by the use of two signal converters and selecting which will act by an altitude sensitive valve. One converter acts from a fuel pressure signal which occurs when afterburner fuel flow is about to start. This produces an air pressure signal to open the exhaust nozzle, for sea level and low altitude use, before fuel starts flowing to the afterburner. The other converter acts from a fuel pressure signal which indicates that fuel is flowing to the afterburner. This produces an air pressure signal which opens the exhaust nozzle, but which because of a time delay will actually open the nozzle after the afterburner has been lighted. The altitude pressure sensitive valve prevents any air pressure signal from coming from the first converter above the predetermined altitude even though the fuel pressure signal has actuated the converter to produce the air signal.

The signal converter acts with very low hysteresis and small differences in fuel pressure because it operates with essentially no friction. This is accomplished by using poppet rather than sliding valves and by guiding the moving parts by thin finger springs which flex rather than slide under load.

Difficulty has been experienced in building a pressure responsive device which operates without failure over a wide range of pressures. My signal converter through the relatively large areas and relatively small displacements and friction, will actuate on a fuel pressure signal as low as 7 p.s.i. and it will withstand without distress a fuel pressure as high as 1000 p.s.i.

An object of my invention, therefore, is a signal converter which converts a fuel pressure signal to an air pressure signal and which has relatively friction free operation.

Another object of my invention is a signal converter which provides dependable operation over a wide range of pressure signals.

Still another object of my invention is a signal modifier for use in the exhaust nozzle control system of an afterburning gas turbine power plant which permits the afterburner to be lighted below some predetermined altitude with the exhaust nozzle open and which automatically permits the lighting of the afterburner above the predetermined altitude with the exhaust nozzle closed.

Other objects and advantages will be apparent from the specification and claims and from the accompanying drawings which illustrate preferred embodiments of the invention.

In the drawings:

Fig. 2 is an enlarged view of the signal modifier;

Fig. 3 is a section view of a signal converter, and

Fig. 4 shows the finger spring used in my signal converter and signal modifier.

Figure 1:
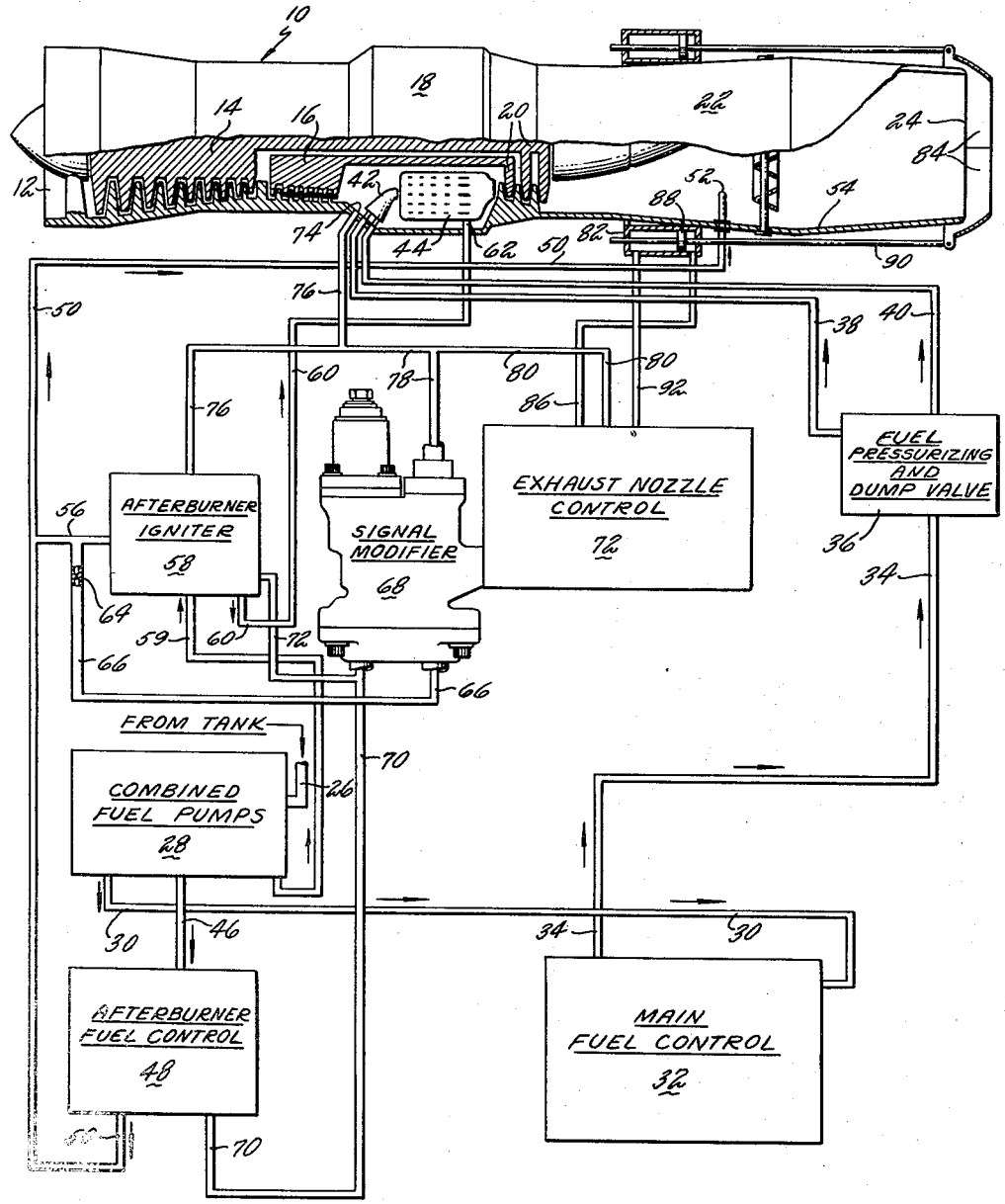
Fig. 1 is a schematic diagram of a gas turbine power plant control and fuel system showing the relative location in the system of a signal modifier in accordance with my invention.

Referring to the drawings in detail, in Fig. 1 a gas turbine power plant is indicated at 10. The power plant has inlet 12, low pressure compressor 14, high pressure compressor 16, burner section 18, turbines 20, afterburner 22 and variable area exhaust nozzle 24 in the direction of gas flow therethrough.

Fuel for the power plant is supplied from a tank, not shown, through conduit 26 to fuel pumps 28. Fuel for the main portion of the power plant, that is burner section 18, is pumped through conduit 30 to main fuel control 32 where it is metered in accordance with predetermined characteristics of power plant operation. Metered fuel flows through conduit 34 to fuel pressurizing and dump valve 36. From this valve primary fuel in conduit 38 and secondary fuel in conduit 40 flow to one or more fuel nozzles 42 in burner section 18 and are then discharged into combustion cans 44 within the burner.

Afterburner fuel is pumped from combined pump 28 through conduit 46 to afterburner fuel control 48 where the afterburner fuel is metered to give the required flow. Metered afterburner fuel flows from the afterburner control through conduit 50 to spray bar 52 mounted on tail pipe 54 within afterburner 22. Fuel in conduit 50 flows also through branch conduit 56 to afterburner igniter 58 where it acts as a signal pressure to initiate discharge of supplemental fuel, supplied to the igniter by conduit 59, through conduit 60 to nozzle 62 in combustion can 44. The supplemental fuel causes a torch of flame to extend momentarily through turbines 20 and into tail pipe 54 of the afterburner to ignite the gas-fuel mixture therein when afterburner operation is desired. Metered afterburner fuel also is supplied from conduit 50 and branch conduit 56 through restriction 64 and branch conduit 66 to signal modifier 68. The operation of the signal modifier will be explained below in detail.

An afterburner fuel pressure signal is supplied from afterburner fuel control 48 through conduit 70 to signal modifier 68 and through conduit 70 and branch conduit 72 to afterburner igniter 58. This pressure signal to igniter 58 prepares the igniter for subsequent initiation of ignition in response to pressure from branch conduit 56.

Compressor discharge pressure is used as an actuating medium by afterburner igniter 58, signal modifier 68 and exhaust nozzle control 72. Pressure station 74 in power plant 10 between the downstream end of high pressure compressor rotor 16 and combustion section 18 senses compressor discharge pressure, or burner pressure as it is sometimes called. The pressure station is connected by line 76 to afterburner igniter 58 and by branch lines 78 and 80 to signal modifier 68 and exhaust nozzle control 72 respectively.

Exhaust nozzle control 72 directs compressor discharge air to one end or the other of cylinder 82 to open or close eyelids 84 on exhaust nozzle 24. When the exhaust nozzle control admits compressor discharge pressure to conduit 86 connected to the right end of cylinder 82, the pressure forces piston 88 within the cylinder to the left. By virtue of rod 90 connecting piston 88 and eyelids 84, movement of the piston to the left opens the eyelids to increase exhaust nozzle area. When the control admits compressor discharge pressure to conduit 92 connected to the left end of cylinder 82, the pressure forces piston 88 and rod 90 to the right to close eyelids 84 and decrease exhaust nozzle area.

Since signal modifier 68 is a unique combination of two signal converters, attention is directed first to the signal converter of Fig. 3 which will now be described in detail. The converter includes housing 94 having bore 96 therein with chamber 98 at the left end of the bore and chamber 100 at the right end of the bore. A pilot valve assembly fits within the bore, the assembly including rod 102 having poppet valve 104 mounted on its left end within chamber 98 and poppet valve 106 mounted on its right end within chamber 100. Spacer 108 surrounds rod 102 and determines the spacing of the poppet valves, the spacing being such that longitudinal movement of the poppet valve assembly within the bore is only a few thousandths of an inch.

This movement is limited by contact of face 110 on poppet valve 104 with shoulder 112 in chamber 98, or by contact of face 114 on poppet valve 106 with shoulder 116 in chamber 100. Thin finger spring 118 guides and centers poppet valve 104 within chamber 98, the valve having a loose fit with the circumferential walls of the chamber, and finger spring 120 guides and centers poppet valve 106 within chamber 100. One of the finger springs is shown in greater detail in Fig. 4. As can be seen the spring includes a plurality of fingers 122 which serve to guide and center any element mounted within and supported thereby. By making the spring very thin and in view of the relatively limited movement of the pilot valve assembly in the signal converter, the fingers tend to flex rather than slide when loaded. In view of this characteristic the spring and poppet valve assembly operates with essentially no friction.

The left face of poppet valve 104 is in contact with diaphragm 124 which is mounted between housing 94 and cover 126 secured to the housing by bolts 128. The inside face of the cover is hollowed to form compartment 130 between the cover and the diaphragm. Passage 132 within the cover connects compartment 130 with threaded hole 134 which is adapted to have a fuel pressure conduit connected thereto in order to admit a fuel pressure signal to the compartment. Diaphragm 124, valve 104 and housing 94 form compartment 136 in chamber 98 to which conduit 138 supplies a relatively low air pressure.

The open end of chamber 100 is closed by cap 140, and compression spring 142 is positioned between the cap and poppet valve 106. Conduit 144 connected to chamber 100 supplies a relatively high air pressure to the chamber. Receiver conduit 146 is connected to bore 96 and is alternately connected to conduit 138 or conduit 144 as will be explained below.

The force of spring 142 normally shifts the poppet valve assembly to the left to close poppet valve 106 with shoulder 116 and to space poppet valve 104 from shoulder 112, thus providing a connection between compartment 136 and bore 96. The air pressure in chamber 100 will variably assist the spring loading in biasing the valve assembly to the left. In this position of the poppet valve assembly the relatively low air pressure from conduit 138 is admitted to receiver conduit 146 by virtue of the connection between compartment 136 and bore 96. When a fuel pressure signal, however, is admitted to compartment 130 it acts upon diaphragm 124 and when the fuel signal exceeds the combined spring and air pressure loading the poppet valve assembly is shifted to the right to close face 110 on poppet valve 104 with shoulder 112 and to open poppet valve 106 with respect to shoulder 116. This provides a connection between chamber 100 and bore 96. Movement of the valve assembly under a dominating fuel pressure signal admits the relatively high air pressure from conduit 144 to receiver conduit 146.

If the fuel pressure signal is afterburner fuel and the relatively high air pressure is compressor discharge pressure, the poppet valve assembly will be actuated for low values of compressor discharge pressure by a low pressure fuel signal. However, for high values of compressor discharge pressure only a high pressure fuel signal will cause actuation of the valve assembly. The resulting air pressure signal admitted to receiver conduit 146 may be used in any desired way and in the applicant's signal modifier it is used to actuate the exhaust nozzle control system as will be explained.

Signal modifier 68 is shown in detail in Fig. 2 and is a combination of two signal converters with an altitude responsive valve which operates to produce the required signal for the exhaust nozzle control. The signal modifier includes housing 148 containing signal converter 150, which will be referred to as the afterburner control converter since it responds to an afterburner control fuel signal, signal converter 152, which will be referred to as the afterburner manifold converter since it responds to an afterburner manifold fuel signal, and altitude valve 154. Housing 148 is mounted on housing 156 of exhaust nozzle control 72, the exhaust nozzle control housing defining chamber 158 containing piston 160. Spring 162 normally positions piston 160 to the left against end wall 164, in which position compressor discharge pressure from branch line 80, Fig. 1, is admitted to conduit 92 and the left end of cylinder 82 to move piston 88 in the cylinder to the right and close eyelids 84.

Compressor discharge pressure is admitted to signal modifier housing 148 in Fig. 2 from branch conduit 78 through filter screen 165 and passage 166 to chamber 168 containing poppet valve 170 of the poppet valve assembly in the afterburner manifold converter. The poppet valve assembly also includes poppet valve 172 contacting diaphragm 174. Spring 175 in chamber 168 normally urges poppet valve 170 against shoulder 176 at the base of chamber 168 to cut off any connection between the chamber and bore 178. Poppet valve 170 is guided and centered in chamber 168 by finger spring 180.

Compressor discharge air in chamber 168 flows through passage 182 to chamber 184 between signal converter 150 and altitude valve 154. From this chamber compressor discharge air passes through one or more ports 186 in ferrule 188 to inner chamber 190 containing loose fitting piston 192. Piston 192 is in contact with the lower face of diaphragm 194 and piston 196 is in contact with the upper face of the diaphragm. The force of compressor discharge pressure tends to push the piston and diaphragm assembly upward, which force is resisted by compression spring 198 in chamber 200. The loading of the spring may be varied by adjustable screw 201. Chamber 200 is connected by port 202 in altitude valve cap 204 to ambient pressure.

At sea level and low altitude operation of a gas turbine power plant compressor discharge pressure is relatively high and the loading of spring 198 is such that compressor discharge pressure in inner chamber 190 exceeds the spring force with the result that the diaphragm and piston assembly is pushed upward. Upward movement of the assembly is limited by stop ring 206. Above a predetermined altitude, when compressor discharge pressure has been considerably reduced, the spring loading is the dominating force and the diaphragm and piston assembly is pushed to its lowermost position. In this position the lower face of piston 192 contacts shoulder 208 on fixed plug 210 cutting off communication through port 212 in the plug between inner chamber 190 and chamber 214 within the plug.

When compressor discharge pressure is sufficiently high to raise piston 192 compressor discharge pressure is admitted to plug chamber 214 which is contiguous with chamber 216 containing poppet valve 218 of the poppet valve assembly in after burner control converter 150. The poppet valve assembly also includes poppet valve 220 contacting diaphragm 222. Spring 224 in chamber 214 normally urges poppet valve 218 against shoulder 226 at the base of chamber 216 to cut off any connection between the chamber and bore 228. Poppet valve 218 is guided and centered in chamber 216 by finger spring 230.

Bore 228 in the afterburner control converter is connected to bore 178 in the afterburner manifold converter by passage 232, and bore 178 in turn is connected to chamber 158 in exhaust nozzle control 72 by passage 234.

Poppet valve 172 in afterburner manifold converter 152 is surrounded by chamber 236 and through cooperative action with shoulder 238 on the lower end of bore 178 controls the connection between the chamber and the bore. Piston is in contact with diaphragm 174 opposite poppet valve 172 and slides in chamber 242 to which fuel from the afterburner manifold is admitted by branch conduit 66. Poppet valve 220 in afterburner control converter 150 is surrounded by chamber 244 and through cooperative action with shoulder 246 on the lower end of bore 228 controls the connection between the chamber and the bore. Piston 248 is in contact with diaphragm 222 opposite poppet valve 220 and slides in chamber 250 to which fuel from the afterburner fuel control is admitted by conduit 70. Chambers 236 and 244 are connected by passage 252 and chamber 244 is connected to ambient pressure by passage 254.

Operation

During normal operation of power plant 10 fuel for the main nozzles 42 in burner section 18 is supplied from combined pumps 28 through main fuel control 32 and its associated conduits. The combined pumps also supply fuel to afterburner fuel control 48 during normal operation, but the fuel does not flow through this control until afterburner operation has been initiated. When control 48 has been activated and afterburner fuel is permitted to flow therethrough a fuel pressure signal is sent through conduit 70 to afterburner control converter 150 in signal modifier 68. Fuel from control 48 flows through conduit 50 to the afterburner manifold and spray bar 52. When fuel has filled the afterburner manifold a fuel pressure signal is sent through restriction 64 and branch conduit 66 to afterburner manifold converter 152 in the signal modifier. It should be obvious that due to the time required for fuel to fill the afterburner manifold and by virtue of restriction 64, the fuel pressure signal in conduit 70 will reach signal modifier 68 before the signal in branch conduit 66 reaches the signal modifier.

Consideration will first be given to the initiation of afterburner operation at sea level or at a relatively low altitude. At this time, since the power plant already is operating, signal modifier 68 will be receiving compressor discharge pressure through branch line 78. This pressure will fill chamber 168 above poppet valve 170 in afterburner manifold converter 152 and, since compressor discharge pressure is sufficiently high to displace diaphragm 194 and piston 192 upward, a pressure signal also will fill chamber 216 above poppet valve 220 in afterburner control converter 150. Spring 175 will be maintaining poppet valve 170 in contact with shoulder 176 to cut off any connection between chamber 168 and bore 178, and poppet valve 172 will be displaced from shoulder 238 so that chamber 236 will be connected to the bore. Similarly, spring 224 will be maintaining poppet valve 218 in contact with shoulder 226 to cut off any connection between chamber 216 and bore 228, and poppet valve 220 will be displaced from shoulder 246 so that chamber 244 will be connected to bore 228. Ambient pressure, therefore, will be present in chamber 158 in exhaust nozzle control 72.

As has been explained above afterburner control converter 150 receives a fuel pressure signal when afterburner operation is initiated, which is prior to the time the signal pressure from conduit 50 and branch conduits 56 and 66 is received by afterburner igniter 58 and afterburner manifold converter 152. Therefore, the poppet valve assembly in afterburner control converter 150 will be shifted upward immediately by the fuel pressure signal on piston 248 and diaphragm 222 to close the connection between poppet valve 220 and shoulder 246 and open the connection between poppet valve 218 and shoulder 226. This will permit compressor discharge pressure in chamber 216 to enter bore 228, passage 232, bore 178, passage 234 and chamber 158. The pressure signal in this chamber will shift piston 160 to the right to admit compressor discharge pressure from branch line 80 to conduit 86 and the right end of cylinder 82 to shift piston 88 and open eyelids 84. Thus, the afterburner can be lighted with the eyelids open.

Considering now the initiation of atferburner operation above some predetermined minimum altitude, compressor discharge pressure is in chamber 168 but is not sufficiently strong to overcome the effect of spring 198 in altitude valve 154. Piston 192 covers port 212 in plug 210 and the compressor discharge pressure signal is not admitted to chamber 216 in afterburner control converter 150. Therefore, when the fuel pressure signal is received by the afterburner control converter and its poppet valve assembly is displaced upward there is no compressor discharge pressure signal to be admitted from chamber 216 to bore 228. Subsequently, afterburner fuel will fill conduit 50 and afterburner manifold and spray bar 52 and through branch conduit 56 will initiate ignition by igniter 58 before an effective fuel pressure signal reaches the signal modifier through restriction 64 and branch conduit 66. This latter signal will displace the afterburner manifold converter poppet valve assembly upward to close poppet valve 172 with shoulder 238 and raise poppet valve 170 to admit compressor discharge pressure to bore 238 and chamber 158 in the exhaust nozzle control. In view of the delay in the air pressure signal reaching the exhaust nozzle control, the afterburner will have been lighted before piston 160 in the exhaust nozzle control is displaced to admit compressor discharge pressure to cylinder 82 to open eyelids 84.

It is to be understood that the invention is not limited to the specific embodiments herein illustrated and described, but may be used in other ways without departure from its spirit as defined by the following claims.

I claim:

1. In combination with an afterburning gas turbine power plant for aircraft, said power plant having an exhaust nozzle, means for varying exhaust nozzle area and an afterburner fuel supply system including a fuel control and a manifold; a signal modifier for actuating said area varying means, said modifier including means responsive to an afterburner fuel control signal for opening said nozzle before lighting the afterburner, means responsive to an afterburner manifold signal for opening said nozzle after lighting the afterburner and altitude responsive means for inactivating said fuel control responsive means above a predetermined altitude.

2. In combination with an afterburning gas turbine power plant for aircraft, said power plant having a compressor and an exhaust nozzle, means for sensing compressor discharge pressure and means for varying exhaust nozzle area; a signal modifier for actuating said area varying means, said modifier including first means to actuate said area varying means to open said nozzle at relatively low altitudes before lighting the afterburner, second means to actuate said area varying means to open said nozzle above a predetermined altitude after lighting the afterburner, and third means responsive to compressor discharge pressure for inactivating said first means above a predetermined altitude.

3. In combination with an afterburning gas turbine power plant for aircraft, said power plant having a compressor and an exhaust nozzle, means for sensing compressor discharge pressure, means for varying exhaust nozzle area and an afterburner fuel supply system including a fuel control and a manifold; a signal modifier for actuating said area varying means, said modifier including means responsive to an afterburner fuel control signal for opening said nozzle before lighting the afterburner, means responsive to an afterburner manifold signal for opening said nozzle after lighting the afterburner, and means responsive to compressor discharge pressure for inactivating said fuel control signal responsive means above a predetermined altitude.

4. In combination with an afterburning gas turbine power plant for aircraft, said power plant having a compressor and a variable area exhaust nozzle, compressor discharge pressure responsive means for varying the area of said nozzle and an afterburner fuel supply system including a fuel control and a manifold; a signal modifier controlling said nozzle area varying means, said modifier including first valve means responsive to fuel pressure in said fuel control, second valve means responsive to fuel pressure in said manifold and third valve means actuated by compressor discharge pressure for admitting compressor discharge pressure through said first valve means to said nozzle area varying means when initiating afterburner operation at relatively low altitudes, means for closing said third valve means above a predetermined altitude, said second valve means being opened by the manifold fuel pressure to admit compressor discharge pressure to said area varying means when afterburner operation is initiated above said predetermined altitude.

5. In combination with an afterburning gas turbine power plant for aircraft, said power plant having a compressor and a variable area exhaust nozzle, compressor discharge pressure responsive means for varying the area of said nozzle and an afterburner fuel supply system including a fuel control and a manifold; a signal modifier controlling said nozzle area varying means, said modifier including first valve means responsive to fuel pressure in said fuel control, second valve means responsive to fuel pressure in said manifold and third valve means actuated by the differential between ambient pressure and compressor discharge pressure for admitting compressor discharge pressure through said first valve means to said nozzle area varying means when initiating afterburner operation at relatively low altitudes, means for closing said third valve means, said second valve means being opened by the manifold fuel pressure to admit compressor discharge pressure to said area varying means when afterburner operation is initiated above said predetermined altitude.

References Cited in the file of this patent

UNITED STATES PATENTS

| | | |
|---|---|---|
| 1,575,771 | King | Mar. 9, 1926 |
| 2,715,311 | Coar | Aug. 16, 1955 |